United States Patent [19]

Bennett

[11] Patent Number: 5,150,540
[45] Date of Patent: Sep. 29, 1992

[54] SINKER SLIDER

[75] Inventor: Robert A. Bennett, Easton, Conn.

[73] Assignees: Charlotte Ambrogio, Stratford; Sally Conant, Orange, both of Conn. ; a part interest

[21] Appl. No.: 848,043

[22] Filed: Mar. 9, 1992

[51] Int. Cl.$^5$ .............................................. A01K 91/02
[52] U.S. Cl. .................................. 43/43.12; 43/44.87
[58] Field of Search ................. 43/43.12, 43.1, 44.83, 43/44.87, 44.9, 44.91, 44.92, 44.93, 44.95; 24/16 PB, 30.5 P

[56] References Cited

U.S. PATENT DOCUMENTS

| | | | |
|---|---|---|---|
| 2,814,903 | 12/1957 | Banowetz | 43/44.87 |
| 3,740,803 | 6/1973 | Arteburn | 43/43.12 |
| 3,744,177 | 7/1973 | Cron | 43/43.12 |
| 3,778,871 | 12/1973 | Ratte | 43/44.87 |
| 5,054,227 | 10/1991 | Lin | 43/43.12 |
| 5,088,228 | 2/1992 | Waldie | 43/43.12 |

*Primary Examiner*—Kurt C. Rowan

[57] ABSTRACT

An integral plastic sinker slider structure utilizes a first hollow cylinder open at both ends. A second hollow cylinder is open at both ends and is parallel to the first cylinder. The two cylinders are disposed side by side and are secured together. The second cylinder is disposed below the first cylinder and has an outer wall with a plurality of equidistantly spaced elongated slots that extend in parallel from one end of the second cylinder to a point intermediate the ends of the second cylinder and form a flexible region with the said one end. This region has an first internal longitudinal bore with a first cross sectional area, the remainder of the second cylinder having a second internal longitudinal bore which is a continuation of the first bore with a second and larger cross sectional area. An elongated member is secured at one end to the outer wall of the second cylinder and has a third cross sectional area intermediate its ends which is smaller than the first area. A device secured to the other end of the member is adapted be engagable with manual pressure into said one end of the second cylinder and held locked therein by the flexure of said region. The device has at least one fourth cross sectional area larger than the first area and smaller than the second area. The locked device is unlocked with the device being released from the second cylinder when a sufficient force is exerted on the device in a direction away from the cylinders.

5 Claims, 1 Drawing Sheet

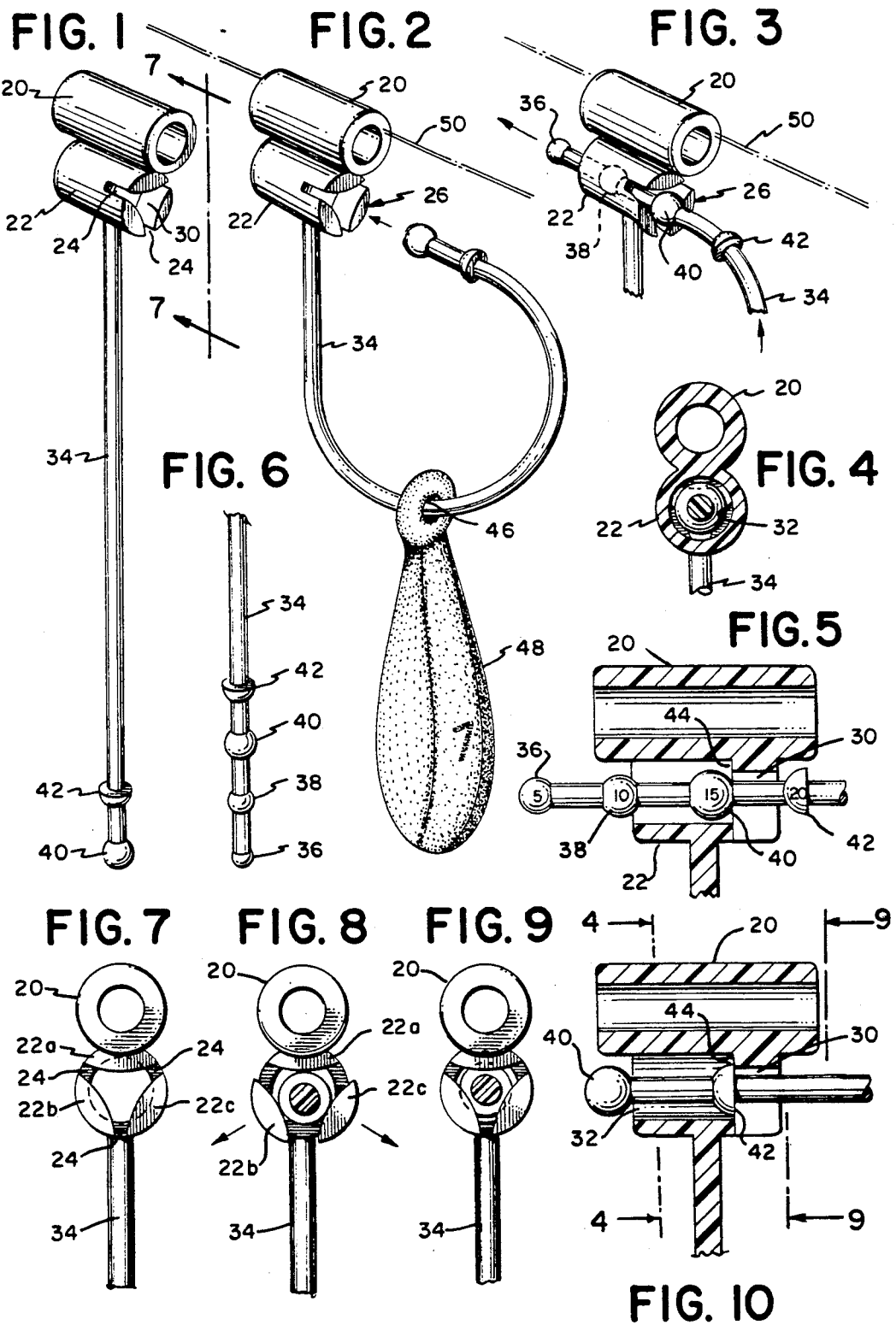

SINKER SLIDER

BACKGROUND OF THE INVENTION

Sinker sliders are devices used by fishermen which consist of a hollow cylinder open at both ends, through which a fishing line extends, a sinker, typically of lead, and a metal link, detachably engagable at one end to the wall of the cylinder and detachably engagable at an opposite end to the sinker.

When a fisherman fishes using a sinker slider, occasionally the sinker may be lodged non-releasably in rocks or other obstruction and the line can only be released by cutting it. As a result, the slider and the forward severed section of the line, together with hooks and or other devices secured to this section, must be abandoned.

The present invention overcomes these difficulties by a sinker slider construction wherein a trapped sinker is released and abandoned, but the line is not cut and all other devices, including the remaining portion of the slider, are retained for subsequent use.

SUMMARY OF THE INVENTION

In accordance with the principles of this invention, a sinker slider structure is constructed in the forma of an integral plastic structure which utilizes a first hollow cylinder open at both ends. The structure also utilizes a second hollow cylinder open at both ends and parallel to the first cylinder. The two cylinders are disposed side by side and secured together with the second cylinder being disposed below the first cylinder. The second cylinder has an outer wall with a plurality of equidistantly spaced elongated slots that extend in parallel from one end of the second cylinder to a point intermediate the ends of the second cylinder and form a flexible region with the said one end. This region has an first internal longitudinal bore with a first cross sectional area. The remainder of the second cylinder has a second internal longitudinal bore which is a continuation of the first bore with a second and larger cross sectional are.

An elongated member is secured at one end to the outer wall of the second cylinder and has a third cross sectional area intermediate its ends which is smaller than the first area.

Means secured to the other end of the member is engagable with manual pressure into said one end of the second cylinder and held locked therein by the flexure of said region. The means has at least one fourth cross sectional area larger than the first area and smaller than the second area, the locked means being unlocked with the means being released from the second cylinder when a sufficient force is exerted on the member in a direction away from the cylinders.

In use, before the means is engaged with the one end of the second cylinder, the means and a portion of the member are pulled through a hole in the head of a sinker, and then the means is locked into the one end of the second cylinder. When the structure is in use, and the sinker is trapped, the fisherman pulls on the line until sufficient force is exerted to unlock the means and release it from the cylinder. The remainder of the member is pulled out of the sinker and is released, whereby only the sinker is abandoned.

The means can be constructed in such manner as to enable the user to selecte different pressures at which release can take place. Different pressures may be needed depending upon the type of fishing lines selected. Some lines will break at lower pressures, while other lines will break at higher pressures. The pressure selected must be lower than the pressure reguired to break the line, otherwise the advantages of the invention may be lost.

BRIEF DESCRIPTION OF THE DRAWINGS

FIG. 1 is a perspective view of the invention prior to use.

FIG. 2 is a perspective view of the invention ready to use.

FIG. 3 is a detail perspective view of the invention in use.

FIG. 4 is a view taken along line 4—4 in FIG. 10.

FIG. 5 is a detail longitudinal cross sectional view of the invention in use.

FIG. 6 is a detail view of a modification of a portion of the structure shown in FIG. 1.

FIG. 7 is an end view similar to FIG. 4 with the sinker supporting member removed and displaying slots whoen in FIG. 1.

FIG. 8 is an end view similar to FIG. 7 with the sinker supporting member in position.

FIG. 9 is a view taken along line 9—9 in FIG. 10.

FIG. 10 shows a modification of the structure shown in FIG. 5.

DETAILED DESCRIPTION OF PREFERRED EMBODIMENTS

Referring now to FIGS. 1-10, an integral plastic sinker slider structure is provided with a first hollow cylinder 20 open at both ends. A second hollow cylinder 22 is open at both ends and parallel to the first cylinder, the two cylinders being disposed side by side and secured together, the second cylinder being disposed below the first cylinder. The second cylinder has an outer wall with a plurality, in this example, three equidistantly spaced elongated slots 24 that extend in parallel from one end 26 of the second cylinder to a point intermediate the ends of the second cylinder and form a flexible region with the end 28. The region has an first internal longitudinal bore 30 with a first cross sectional area. The remainder of the second cylinder has a second internal longitudinal bore 32 which is a continuation of the first bore with a second and larger cross sectional area.

An elongated member 34 secured at one end to the outer wall of the second cylinder has a third cross sectional area intermediate its ends which is smaller than the first area Means secured to the other end of the member is engagable with manual pressure into said one end of the second cylinder and held locked therein by the flexure of said region. This means has at least one fourth cross sectional area larger than the first area and smaller than the second area, the locked means being unlocked with the means being released from the second cylinder when a sufficient force is exerted on the means in a direction away from the cylinders.

The means consists of at least one ball or sphere and one half ball or sphere. As shown, there are three spaced apart balls 36, 38 and 40 and one half ball 42. Each of these balls and half ball has a cross sectional area larger than that of bore 30 and smaller than that of bore 32. The area of half ball 42 is larger than that of ball 40, which is larger than ball 38, which is larger than ball 36. However, each ball or half ball can be squeezed through bore 30 into bore 32 because of the flexing action of the region; once squeezed into bore 32, the flexing action locks it into place. The pull or force required to reverse the squeezing action depends upon the cross sectional area of the ball or half ball, increasing with increasing area. Thus ball 36 releases typically on a pull of five pounds; ball 38 at ten pounds; ball 40 at fifteen pounds and half ball 42 at twenty pounds. Half ball 42, once inserted into bore 32 bears against a shoulder 44 between the two bores.

The slots divide the cylinder 22 in the region of flexure into sections 22a, 22b, and 22c. Section 22a is integral with cylinder 20 and does not flex; the other two sections provide the flexing action.

In use, the free end of member 34 is drawn through the head opening 46 of sinker 48 and then the fishing line 50 is drawn though cylinder 20.

What is claimed is:

1. An integral plastic sinker slider structure comprising:

a first hollow cylinder open at both ends;

a second hollow cylinder open at both ends and parallel to the first cylinder, the two cylinders being disposed side by side and secured together, the second cylinder being disposed below the first cylinder, the second cylinder having an outer wall with a plurality of equidistantly spaced elongated slots that extend in parallel from one end of the second cylinder to a point intermediate the ends of the second cylinder and form a flexible region with the said one end, the region having an first internal longitudinal bore with a first cross sectional area, the remainder of the second cylinder having a second internal longitudinal bore which is a continuation of the first bore with a second and larger cross sectional area;

an elongated member secured at one end to the outer wall of the second cylinder and having a third cross sectional area intermediate its ends which is smaller than the first area; and means secured to the other end of the member and adapted be engagable with manual pressure into said one end of the second cylinder and held locked therein by the flexure of said region, the means having at least one fourth cross sectional area larger than the first area and smaller than the second area, the locked means being unlocked with the means being released from the second cylinder when a sufficient force is exerted on the means in a direction away from the cylinders.

2. The structure of claim 1 wherein the means includes at least one sphere.

3. The structure of claim 2 wherein said means includes a plurality of spheres spaced from each other.

4. The structure of claim 3 wherein said means also includes a half sphere.

5. The structure of claim 4 wherein the fourth cross sectional areas of the spheres and half sphere differ from each other and are arranged in order of increasing area as viewed from the other end of the member.

* * * * *